(12) United States Patent
Rueger et al.

(10) Patent No.: US 9,916,459 B2
(45) Date of Patent: Mar. 13, 2018

(54) PHOTOGRAPH METADATA ENCRYPTION

(71) Applicant: International Business Machines Corporation, Armonk, NY (US)

(72) Inventors: Erik Rueger, Ockenheim (DE); Tim U. Scheideler, Schoenenberg (CH); Matthias Seul, Kassel (DE); Thomas A. Snellgrove, Wakefield, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/831,970

(22) Filed: Aug. 21, 2015

(65) Prior Publication Data

US 2017/0053122 A1    Feb. 23, 2017

(51) Int. Cl.
| H04N 1/44 | (2006.01) |
| G06F 21/60 | (2013.01) |
| G06F 21/62 | (2013.01) |

(52) U.S. Cl.
CPC ........ *G06F 21/602* (2013.01); *G06F 21/6209* (2013.01); *G06F 21/6227* (2013.01); *G06F 2221/2107* (2013.01)

(58) Field of Classification Search
CPC ............... G06F 21/602; G06F 17/3012; G06F 17/30268
USPC ........................................................ 380/246
See application file for complete search history.

(56) References Cited

U.S. PATENT DOCUMENTS

| 8,121,342 B2 | 2/2012 | Davis et al. |
| 8,687,018 B1 | 4/2014 | Stout |
| 8,909,773 B2 | 12/2014 | Tessman, Jr. et al. |
| 2002/0088000 A1 | 7/2002 | Morris |
| 2004/0123131 A1 | 6/2004 | Zacks et al. |
| 2004/0249768 A1 | 12/2004 | Kontio et al. |
| 2004/0268251 A1 | 12/2004 | Sandovsky et al. |
| 2005/0154695 A1 | 7/2005 | Gonzalez et al. |
| 2006/0056625 A1* | 3/2006 | Nakabayashi ........ H04L 9/0662 380/46 |
| 2006/0221190 A1 | 10/2006 | Limberis et al. |
| 2009/0043637 A1 | 2/2009 | Eder |
| 2010/0049502 A1 | 2/2010 | Oppenheim et al. |
| 2011/0055176 A1 | 3/2011 | Choi et al. |
| 2011/0129120 A1* | 6/2011 | Chan ................. G06F 17/30241 382/103 |

(Continued)

OTHER PUBLICATIONS

Henne et al., "Short Paper: On the Awareness, Control and Privacy of Shared Photo Metadata", In 18th International Conference on Financial Cryptography and Data Security (FC 2014). vol. 8437 Springer, pp. 1-12, http://fc14.ifca.ai/papers/fc14_submission_117.pdf>.

(Continued)

*Primary Examiner* — Teshome Hailu

(74) *Attorney, Agent, or Firm* — Stephanie L. Carusillo

(57) ABSTRACT

Methods, systems, and computer program products for encrypting photograph metadata are provided. An image file is received. The image file includes digital image data and a plurality of data fields. A first data field of the plurality of data fields includes a first metadata. A rule set for modifying the first metadata is received. In response to determining that at least one rule of the rule set corresponds to the first metadata, the first metadata is encrypted based to create a second metadata. The second metadata is stored in the image file.

20 Claims, 4 Drawing Sheets

(56) References Cited

U.S. PATENT DOCUMENTS

| | | | |
|---|---|---|---|
| 2011/0254687 A1* | 10/2011 | Arponen | H04M 1/72525 340/540 |
| 2011/0292231 A1 | 12/2011 | Winters | |
| 2012/0110323 A1 | 5/2012 | Colclasure et al. | |
| 2013/0036364 A1 | 2/2013 | Johnson | |
| 2013/0073574 A1 | 3/2013 | Jin et al. | |
| 2013/0088616 A1 | 4/2013 | Ingrassia, Jr. | |
| 2013/0117847 A1 | 5/2013 | Friedman et al. | |
| 2013/0191922 A1 | 7/2013 | Rigas | |
| 2014/0376767 A1 | 12/2014 | Powers et al. | |
| 2015/0035999 A1* | 2/2015 | Shehane | H04N 5/225 348/207.1 |
| 2015/0169306 A1 | 6/2015 | Labocki et al. | |
| 2016/0170583 A1 | 6/2016 | Heics | |
| 2016/0283743 A1 | 9/2016 | Rueger et al. | |

OTHER PUBLICATIONS

"Adobe Photoshop File Info", PHOTO META DATA.org, pp. 1-3, printed on Apr. 23, 2015, <http://www.photometadata.org/meta-tutorials-adobe-photoshop>.

"Certificate, Key, and Trust Services Programming Guide", Introduction, pp. 1-2, Copyright © 2003, 2013 Apple Inc., <https://developer.apple.com/library/mac/documentation/Security/Conceptual/CertKeyTrustProgGuide/01introduction/introduction.html#//apple_ref/doc/uid/TP40001358>.

"Controlled Vocabulary, one thing leads to another", The IPTC-NAA standards, pp. 1-6, printed on Apr. 23, 2015, <http://www.controlledvocabulary.com/imagedatabases/iptc_naa.html>.

"Encrypting and Hashing Data", Copyright © 2014 Apple Inc., pp. 1-4, <https://developer.apple.com/library/mac/documentation/Security/Conceptual/cryptoservices/GeneralPurposeCrypto/GeneralPurposeCrypto.html#//apple_ref/doc/uid/TP40011172-CH9-SW1>.

"Extensible Metadata Platform (XMP)", Copyright © 2015 Adobe Systems Incorporated, pp. 1-2, <http://www.adobe.com/products/xmp.html>.

"Guide to Photo Metadata Fields", Photo Meta Data.org, pp. 1-11, Printed on Apr. 23, 2015, <http://www.photometadata.org/meta-resources-field-guide-to-metadata>.

"IPTC Information Interchange Model", From Wikipedia, the free encyclopedia, pp. 1-3, This page was last modified on Jul. 22, 2014, <https://en.wikipedia.org/wiki/IPTC_Information_Interchange_Model>.

"Photo Metadata", Oct. 2014, IPTC Information Technology for News, IPTC Standard, IPTC Core, Specification Version 1.2, IPTC Extension, Specification Version 1.2, Document Revision 3, Copyright © 2015, International Press Telecommunications Council, pp. 1-74, <http://www.iptc.org/std/photometadata/specification/IPTC-PhotoMetadata>.

"Transmitting Data Securely", Cryptographic Services Guide, pp. 1-4, Copyright © 2014 Apple Inc., <https://developer.apple.com/library/mac/documentation/Security/Conceptual/cryptoservices/SecureNetworkCommunicationAPIs/SecureNetworkCommunicationAPIs.html#//apple_ref/doc/uid/TP40011172-CH13-SW1>.

IBM, Appendix P: List of IBM Patents or Patent Applications Treated As Related, dated Dec. 6, 2016, 2 pages.

* cited by examiner

PHOTOGRAPH METADATA ENCRYPTION

BACKGROUND OF THE INVENTION

The present invention relates generally to the field of photograph metadata, and more particularly to encryption of photograph metadata.

Photograph metadata is data that has been written into a digital image file. Multiple photographic metadata standards exist and each include different sets of data written to the photograph. Data written to the photographs may include, but is not limited to, an owner of the photograph, copyright information, contact information for the photograph owner, a camera serial number, exposure information, and GPS location indicating where the photograph was taken. Some new technologies may identify the people in the photographs and include the names of those photographed in the metadata.

Metadata maintained with the digital image file can be accessed and read by most computing devices. Photographs uploaded to websites, including social media platforms, may maintain the metadata written to the digital image file by the camera. The rise of photograph sharing via social media has revealed a privacy concern for users who are unaware of what information is shared when the photograph is published.

Metadata may be removed from digital image files by some social media platforms. Once the metadata is removed from the photograph by the social media platform the metadata cannot be retrieved for that file. Unless a secondary copy of a digital image file is maintained by the user, the metadata can be lost.

SUMMARY

According to one embodiment of the present invention, a method for encrypting photograph metadata is provided. The method includes receiving an image file, wherein the image file comprises digital image data and a plurality of data fields, wherein a first data field of the plurality of data fields comprises a first metadata; receiving a rule set for modifying the first metadata; responsive to determining that at least one rule of the rule set corresponds to the first metadata, encrypting the first metadata based on the at least one rule of the rule set to create a second metadata; and storing the second metadata in the image file.

According to another embodiment of the present invention, a computer program product for encrypting photograph metadata is provided. The computer program product comprises a computer readable storage medium and program instructions stored on the computer readable storage medium. The program instructions include program instructions to receive an image file, wherein the image file comprises digital image data and a plurality of data fields, wherein a first data field of the plurality of data fields comprises a first metadata; program instructions to receive a rule set for modifying the first metadata; responsive to determining that at least one rule of the rule set corresponds to the first metadata, program instructions to encrypt the first metadata based on the at least one rule of the rule set to create a second metadata; and program instructions to store the second metadata in the image file.

According to another embodiment of the present invention, a computer system for encrypting photograph metadata is provided. The computer system includes one or more computer processors, one or more computer readable storage media, and program instructions stored on the computer readable storage media for execution by at least one of the one or more processors. The program instructions include program instructions to receive an image file, wherein the image file comprises digital image data and a plurality of data fields, wherein a first data field of the plurality of data fields comprises a first metadata; program instructions to receive a rule set for modifying the first metadata; responsive to determining that at least one rule of the rule set corresponds to the first metadata, program instructions to encrypt the first metadata based on the at least one rule of the rule set to create a second metadata; and program instructions to store the second metadata in the image file.

DETAILED DESCRIPTION

An embodiment of the present invention recognizes that metadata associated with a digital image file is both useful and poses a security risk if not regulated. Security risks arise from the information shared, such as GPS location, identities of people in the photograph, or a thumbnail picture of a photograph that has been cropped. Current methods of minimizing security risks though managing metadata include deleting the metadata of a digital image file. Metadata deleted from an image file cannot be recovered. While the metadata can pose a security risk, it is also a helpful tool. For example, the metadata that includes a date or GPS location can provide context to a photograph at a later date.

An embodiment of the present invention provides encryption of photograph metadata. Encrypting photograph metadata secures the data from parties not privileged to view the information contained in the data. Encrypting the data within an image file secures the data without risking a data loss due to storing the data and photograph separately. Embodiments of the present invention allow a photograph owner to choose what information is shared and with whom the information is shared.

Figure 1:
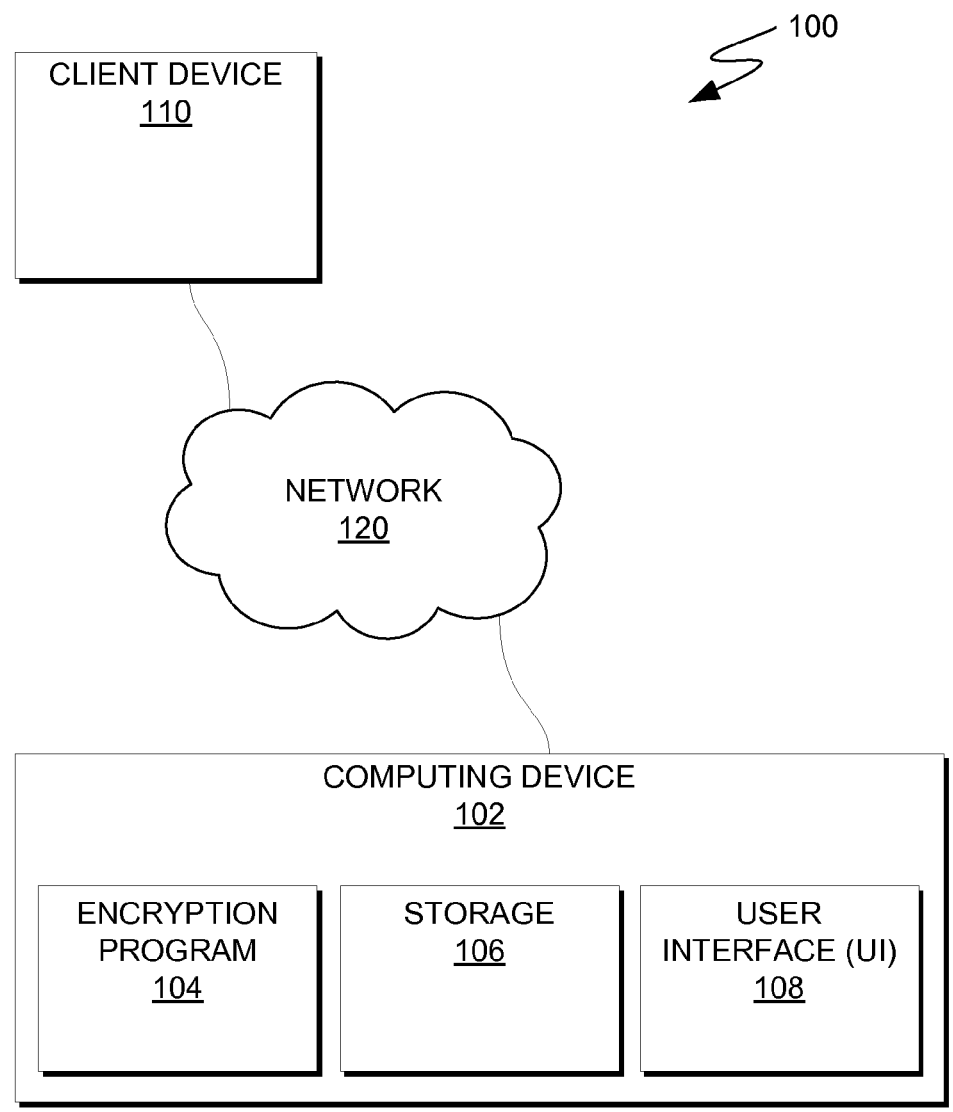
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 102 and client device 110 connected over network 120. Computing device 102 includes encryption program 104 and storage 106.

In various embodiments, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to client device 110, and with access to and/or capable of executing encryption program 104. Computing device 102 may include internal and external hardware components, as depicted and described in further detail with respect to FIG. 4.

In this exemplary embodiment, encryption program 104 and storage 106 are stored on computing device 102. In other embodiments, one or both of encryption program 104 and storage 106 may reside on another computing device, provided that each can access and is accessible by each other of encryption program 104, storage 106 and client device 110. In yet other embodiments, one or both of encryption program 104 and storage 106 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between computing device 102 and client device 110, in accordance with a desired embodiment of the present invention.

Encryption program 104 operates to encrypt and decrypt metadata written to a photograph. In some embodiments, metadata is encrypted within the metadata field. A metadata field is a data field embedded in the photograph used to store information about the photograph. A photograph may have multiple metadata fields (e.g., geographic location, time and date, camera model, photograph dimensions, etc.). For example, where a geographic location is encrypted in the metadata field, the encrypted data overwrites the unencrypted data and maintains the same format (e.g., the unencrypted data is 66° 33' 39" N and 25° 43' 00" E; a sample encryption can be 52° 01' 21 N and 08° 41' 58" E). In other embodiments, encrypted metadata is stored in an unused metadata field. For example, some fields are left blank by the camera (e.g., title fields, tag fields, comment fields, etc.). In these embodiments, encryption program 104 encrypts the metadata and may write the encrypted data to an unused field. In other embodiments, encrypted metadata is stored as a binary block at the end of the photograph image file. In still other embodiments, the encrypted metadata is stored inside the image file by manipulating image data (e.g., hue or brightness). In some embodiments, where the encryption is stored outside original metadata field, the unencrypted metadata is removed. In other embodiments, where the encryption is stored outside original metadata field, the unencrypted metadata is subject to automated information translucence.

Automated information translucence replaces the unencrypted metadata with user defined metadata. For example, exact geographic location coordinates can be replaced with the coordinates of a city center. In another embodiment, automated information translucence is used to modify names. For example, a metadata field includes the names of the people whose faces appear in the photograph. In some embodiments, encryption program 104 removes a portion of the name (e.g., the last name) for each person in the photograph. In other embodiments, the names are replaced with predefined names. For example, encryption program 104 contains a list of generic names. When a metadata field contains a name of a photographed person, encryption program 104 replaces the name with generic name from the list. In some embodiments, encryption program 104 uses a list of predefined entries for each of the metadata fields, for the purpose of automated information translucence.

In some embodiments, encryption program 104 uses rules established by the user to encrypt photograph metadata. In some embodiments, the user establishes what type of metadata is encrypted (e.g., locations, identities, dates, etc.). In other embodiments, the user establishes conditions that must be met to encrypt the photograph metadata (e.g., where a person appears in the photograph or where the geographic coordinates are within a user defined area). In one embodiment, the user encryption preferences are stored in a user profile, which includes encryption rules and an encryption key. As used herein, an encryption key is an authentication credential, such as, for example, a password, a security token, or a digital certificate. In this case, encryption program 104 accesses a user profile to determine what encryption rules to apply to photograph metadata. In some embodiments, a device has more than one user profile. In other embodiments, encryption program 104 receives one or both of the encryption rules and encryption key from any of various sources. In various example, encryption program 104 receives encryption rules or an encryption key based on user input (e.g., via user interface 108), from storage 106, or from client device 110.

In some embodiments, encryption program 104 includes metadata searching capabilities. For example, a user can search for a location and photographs within the geography search limits will populate. In some embodiments, encryption program 104 is able to load and decrypt the metadata simultaneous to the search. In some embodiments, a user can revert modified metadata to its original form, where privacy needs change. For example, the geographic location of a photograph is encrypted and stored to an unused metadata field. Additionally, the metadata in the original metadata field is modified to reflect a city center. At a later date the user does not need the exact coordinates to be private and replaces the city center with the original metadata.

In some embodiments, encryption program 104 is part of a photograph editing or photograph viewing program. In other embodiments, encryption program 104 is part of a camera or photograph management application on a mobile device (e.g., a smartphone). In some embodiments, where encryption program 104 is part of a camera application, the photograph metadata is encrypted before any other programs can access the photograph.

Storage 106 operates as a data repository that may be written to or read by encryption program 104. Image files may be stored to storage 106. In some embodiments, storage 106 may be written to or read by programs or entities outside of computing environment 100.

Computing device 102 includes a user interface (UI) 108, which executes locally on computing device 102 and operates to provide a user interface to a user of computing device 102. UI 108 further operates to receive user input from a user via the provided user interface, thereby enabling the user to interact with computing device 102. In one embodiment, UI 108 provides a user interface that enables a user of computing device 102 to interact with encryption program 104 of computing device 102. In various examples, the user interacts with encryption program 104 in order to initiate metadata encryption of an image file. In one embodiment, UI 108 is stored on computing device 102. In other embodiments, UI 108 is stored on another computing device (e.g., client device 110), provided that UI 108 can access and is accessible by at least encryption program 104.

In various embodiments of the present invention, client device 110 can be a laptop computer, a tablet computer, a netbook computer, a personal computer (PC), a desktop computer, a personal digital assistant (PDA), a smart phone, or any programmable electronic device capable of communicating with computing device 102 via network 120. In some embodiments, client device 110 includes a camera capable of taking photographs and writing metadata to the photograph.

Figure 2:
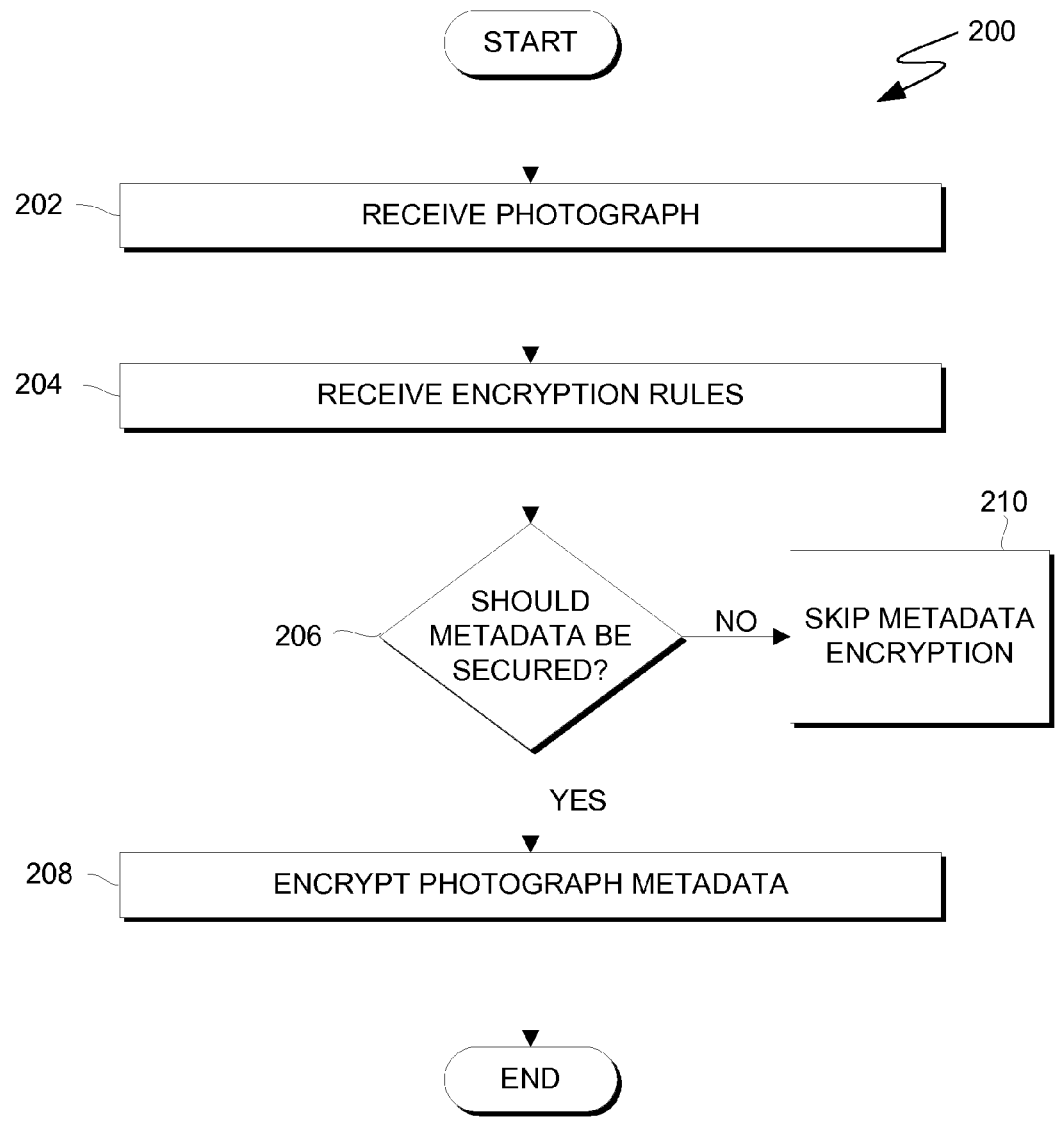
FIG. 2 is a flowchart depicting operations for encrypting photograph metadata, on a computing device within the computing environment of FIG. 1, in accordance with an embodiment of the present invention.

FIG. 2 is a flowchart depicting operations for encrypting photograph metadata, on a computing device within the computing environment of FIG. 1, in accordance with an embodiment of the present invention. For example, FIG. 2 is a flowchart depicting operations 200 of encryption program 104, on computing device 102 within computing environment 100.

In step 202, encryption program 104 receives a photograph. In one embodiments, the photograph is received from a camera or other image capturing device. For example, computing device 102 or client device 110 may include a camera. In another embodiments, encryption program 104 receives the photograph from a storage device, such as storage 106 on computing device 102. In some embodiments, where the photograph has previously been received by encryption program 104 and the metadata encrypted, a user can share the encryption key with other users to permit the other users to view the metadata. In these embodiments, the user is prompted for the encryption key in response to attempting to decrypt the encrypted metadata of the photograph.

In step 204, encryption program 104 receives encryption rules. Encryption rules are used to determine what is encrypted and where the encryption is stored. In one embodiment, encrypted metadata is stored in the same field and in the same format as the unencrypted metadata. For example, the encrypted metadata replaces the unencrypted metadata. In another embodiment, encrypted metadata is stored in one or more unused fields of the metadata. In yet another embodiment, the encrypted metadata is stored as a binary block within the image file. In another embodiment, the encrypted metadata is stored by manipulating the photograph. For example, the encrypted metadata is stored by changing the image hue or brightness. In some embodiments, some metadata fields are left unencrypted. For example, metadata including information that can be deduced from the photograph itself (e.g., dimensions or color depth) may be left unencrypted. In some embodiments, encryption storage is based on a user profile. In other embodiments, encryption storage is based on a prompt issued to a user of encryption program 104.

In some embodiments, the encryptions rules include policies regarding the types of metadata to encrypt. In some embodiments, all metadata is encrypted. In other embodiments, some metadata fields are encrypted and other fields are left unencrypted. For example, a user can choose to encrypt location data but leave a camera model unencrypted. In some embodiments, a user defines rules for encrypting specific metadata fields. For example, with respect to location metadata, rules can range from encrypting all location metadata, encrypting location metadata with locations in a specified region, encrypting location metadata based on the content of the photographs (e.g., where people are in the photograph), etc. In some embodiments, the rules indicate when metadata is encrypted. For example, the user can specify a rule that encrypts location data when the photograph is uploaded to a social media website.

In decision 206, encryption program 104 determines whether photograph metadata should be secured. If encryption program 104 determines that the photograph metadata should be secured (decision 206, YES branch), then encryption program 104 receives encrypts the metadata (step 208). In one embodiment, encryption program 104 determines whether photograph metadata should be secured based on a user interaction with a prompt. For example, encryption program 104 prompts a user for security features (e.g., the encryption key) of one or more captured photographs. In another embodiment, encryption program 104 determines whether photograph metadata should be secured (e.g., encrypted) based on an initial user setup (e.g., a user profile). For example, a user can establish as setup in which all geographic locations are to be encrypted. When encryption program 104 receives a photograph with geographic location metadata, encryption program 104 determines that the metadata should be secured.

If encryption program 104 determines that the photograph metadata does not need to be secured (e.g., based on user prompt or user setup) (decision 206, NO branch), then encryption program 104 skips the metadata encryption (step 210) and ends. Where encryption program 104 determines that the photograph metadata does not need to be secured, the photograph metadata is not modified.

In step 208, encryption program 104 encrypts photograph metadata. Encryption program 104 encrypts the metadata based on the rules received in step 206. In some embodiments, encrypted metadata is stored in the same format as the unencrypted metadata. In some embodiments, the encryption algorithm is restricted to using the symbol types used in the unencrypted metadata. For example, where the unencrypted metadata only contains numbers, the encryption is limited to numbers. In some embodiments, the encryption algorithm includes rules to further maintain the format of the unencrypted metadata. For example, where cardinal directions are present in unencrypted metadata, the encryption is limited to north, south, east, and west. In another example, where the unencrypted metadata is a time, the encryption of an hour cannot exceed 23. In some embodiments, the encryption is set to the same symbol length as the unencrypted metadata. For example, twelve characters of unencrypted metadata are replaced by twelve characters of encrypted metadata. In other embodiments, the encryption algorithm is not restricted to the format of the unencrypted metadata. For example, where the unencrypted metadata is a geographic coordinate, any combination of characters can be used for the encryption. In another embodiment, the encryption algorithm includes predefined entries for select metadata fields. For example, where the metadata is a camera model, the encryption algorithm can contain a list of camera models. In this example, when encryption program 104 is encrypting a camera model (e.g., "Model A"), the unencrypted data is replaced with a corresponding camera model from a predefined list (e.g., "Model B"). In some embodiments, predefined lists are used to disguise the encryption of the metadata, such that an unauthorized user may not recognize that the metadata is encrypted.

In some embodiments, encryption program 104 uses an indicator to mark the metadata as encrypted, such that encryption program 104 knows to decrypt the metadata at a later time. For example, all of the encrypted entries can result in a particular checksum, which may be predetermined, communicated separately from the image file, or stored within the image file. In another example, encryption program 104 writes a flag to an unused field of the metadata.

In embodiments where the encrypted metadata is stored outside of the original field, encryption program 104 creates a map linking the encrypted metadata to the source field. In some embodiments, the unencrypted metadata in the source field is modified. For example, the metadata is a source field for geographic location can be modified, where the encrypted location metadata is stored outside the source field. In one example, the source field geographic location may be changed to identify a city center.

Encryption program 104 uses the encryption key of the user profile to decrypt the photograph metadata. In some embodiments, a user can transmit the encryption key to another user to allow the other user to decrypt the metadata. In some embodiments, the user sends the encryption key. In other embodiments, the user sends the complete user profile which contains the rules and the encryption key.

Figure 3:
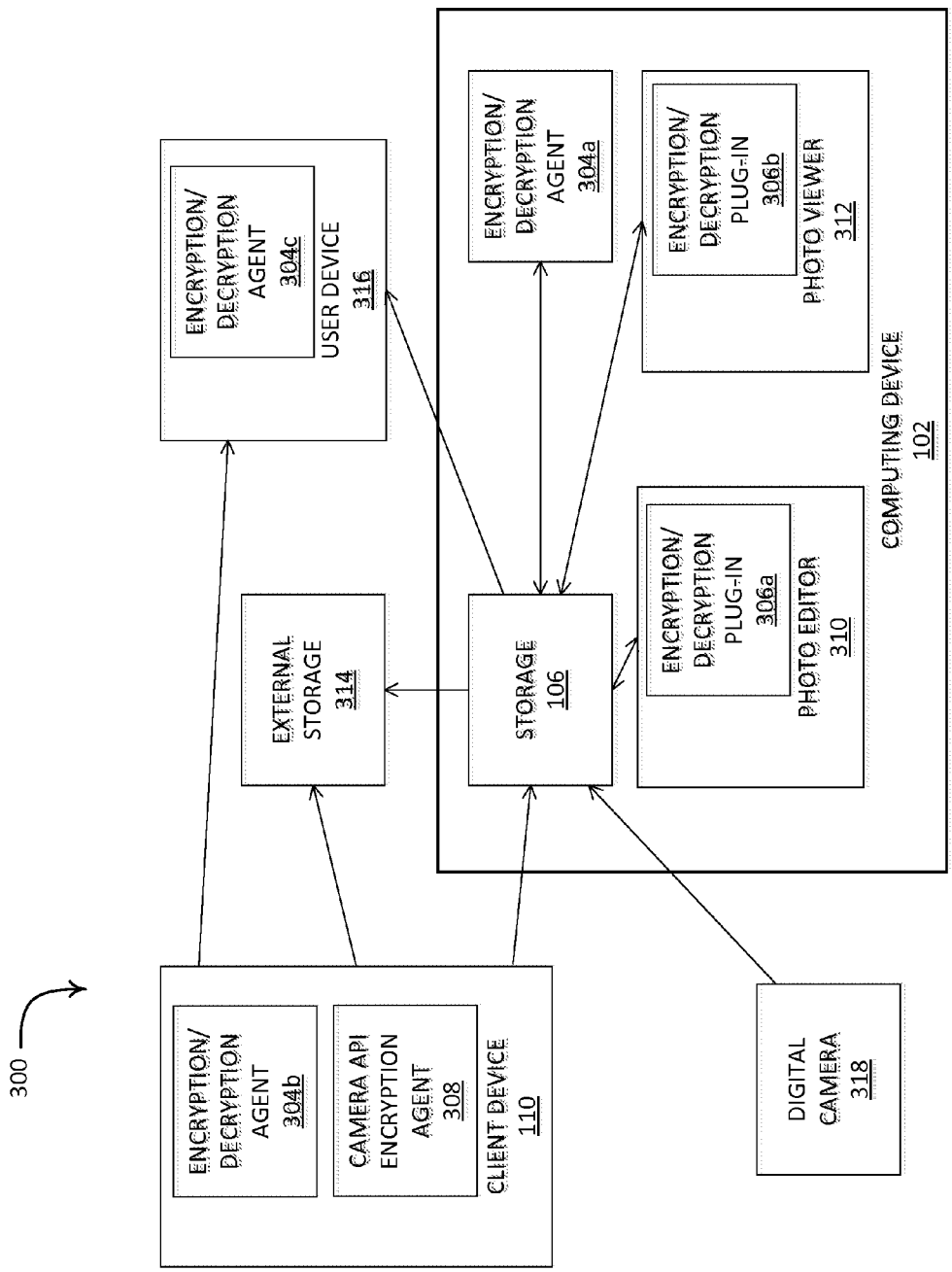
FIG. 3 is a functional block diagram illustrating a photograph metadata encryption environment, in accordance with an embodiment of the present invention.

FIG. 3 is a functional block diagram illustrating a photograph metadata encryption environment, in accordance with an embodiment of the present invention. For example, FIG. 3 is a functional block diagram illustrating encryption environment 300. Encryption environment 300 includes computing device 102, client device 110, external storage 314, user device 316, and digital camera 318.

In various embodiments, the components in encryption environment 300 include an encryption/decryption agent or an encryption/decryption plug-in. The encryption/decryption agents and encryption/decryption plug-ins are various embodiments of encryption program 104. For example, computing device 102 includes encryption/decryption agent 304a, client device 110 include encryption/decryption agent 304b, and user device 316 includes encryption/decryption agent 304c. Encryption/decryption agent 304a-c encrypts photograph metadata according to rules defined in the user profile. In some embodiments, encryption/decryption agent 304b operates transparently in the background after the photograph has been stored on storage media of client device 110. In some embodiments, encryption/decryption agent 304a operates as encryption program 104 as discussed above.

In one embodiment, client device 110 includes camera application interface (API) encryption agent 308. In some embodiments, camera API encryption agent 308 automatically encrypts the photograph metadata when the photograph is produced by the camera API. In these embodiments, the metadata is encrypted before any other API on client device 110 can access metadata. In some embodiment camera API encryption agent 308 operates at the operating system level, which prevents an API from uploading the unencrypted photograph metadata.

In various embodiments, one or more components in encryption environment 300 include an encryption/decryption plug-in. For example, photo editor 310 includes encryption/decryption plug-in 306a and photo viewer 312 includes encryption/decryption plug-in 306b. In some embodiments, encryption/decryption plug-in 306a and 306b permit the user to access and encrypt photograph metadata during image processing.

Encryption environment 300 includes storage 106 and external storage 314. Storage 106 and external storage 314 are used to store photographs, including photographs with encrypted metadata. For example, client device 110, computing device 102, and digital camera 318 can write to both storage 106 and external storage 314. Further computing device 102 and client device 110 can read information from storage 106 and external storage 314. For example, a photograph with unencrypted metadata is saved to storage 106 by digital camera 318. In some embodiments, encrypted photographs can be sent to other users, with an encryption key, for the other user to access. For example, a photograph with encrypted metadata is sent from client device 110 to user device 316. User device 316 includes encryption/decryption agent 304c, which can decrypt the metadata using the encryption key.

Figure 4:
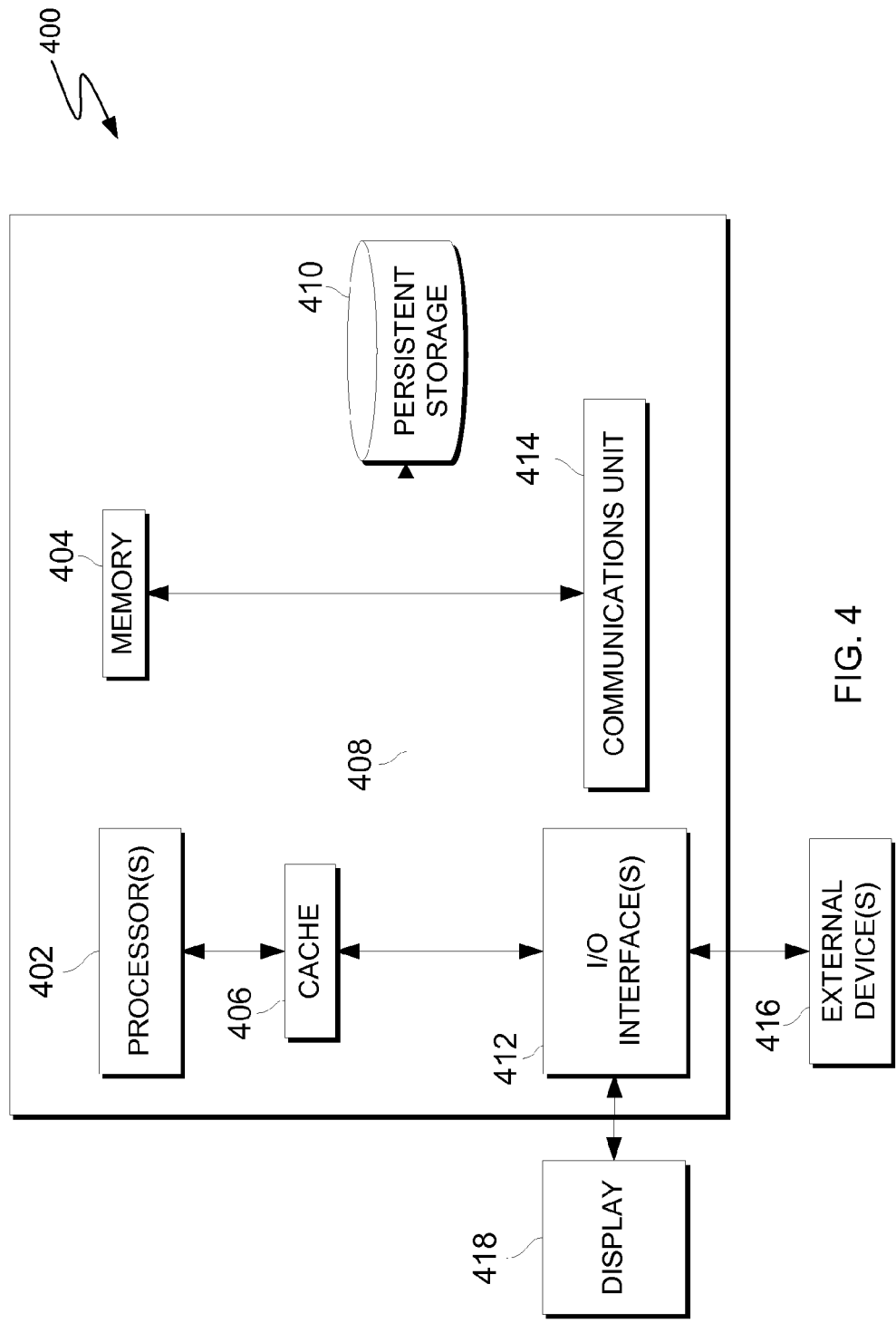
FIG. 4 is a block diagram of components of a computing device executing operations for encrypting photograph metadata, in accordance with an embodiment of the present invention.

FIG. 4 is a block diagram of components of a computing device, generally designated 400, in accordance with an embodiment of the present invention. In one embodiment, computing device 400 is representative of computing device 102. For example, FIG. 4 is a block diagram of computing device 102 within computing environment 100 executing operations of encryption program 104.

It should be appreciated that FIG. 3 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 120. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 418 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing photograph metadata, the method comprising:
   receiving, by one or more processors, an image file, wherein the image file comprises digital image data and a plurality of data fields, wherein a first data field of the plurality of data fields comprises a first metadata, wherein the first metadata is an ordered string of characters including a first character of a first symbol type and second character of a second symbol type;
   receiving, by one or more processors, a rule set for modifying the first metadata;
   responsive to determining that at least one rule of the rule set corresponds to the first metadata, encrypting, by one or more processors, the first metadata based on the at least one rule of the rule set to create a second metadata, wherein the encryption is restricted to converting the first character to a third character of the first symbol type and converting the second character to a fourth character of the second symbol type; and
   storing, by one or more processors, the second metadata in the image file.

2. The method of claim 1, wherein the second metadata is stored in the first metadata field.

3. The method of claim 1, wherein the second metadata is stored to a blank data field of the plurality of data fields, and further comprising:
   modifying, by one or more processors, the first metadata in the first metadata field.

4. The method of claim 1, wherein the second metadata is stored as a binary block, and wherein the block is appended to the image file.

5. The method of claim 1, wherein the first metadata includes at least one of: a GPS location, a user identification, one or more names of people in a photograph, a copyright statement, a user contact, a camera serial number, a landmark identification, and a time stamp.

6. The method of claim 1, wherein the second metadata is stored to a blank data field of the plurality of data fields, and further comprising:
   deleting, by one or more processors, first metadata in the first data field.

7. The method of claim 1, wherein the stored image file comprises at least one of (i) an encrypted first metadata field, (ii) a modified second metadata field, and (iii) an encrypted third metadata field.

8. The method of claim 1, wherein encrypting the first metadata based on the at least one rule of the rule set to create the second metadata further comprises maintaining, by one or more processors, the order of respective symbol types of the first metadata in the second metadata within the ordered string of characters.

9. The method of claim 1, wherein the first symbol type is a number and the second symbol is an indicator of a cardinal direction.

10. The method of claim 1, wherein the first metadata comprises GPS coordinates with symbol types comprising a number, a degree symbol, a minute symbol, and an indicator of a cardinal direction.

11. A computer program product, the computer program product comprising:
    a computer readable storage device and program instructions stored on the computer readable storage device, the program instructions comprising:
    program instructions to receive an image file, wherein the image file comprises digital image data and a plurality of data fields, wherein a first data field of the plurality of data fields comprises a first metadata, wherein the first metadata is an ordered string of characters including a first character of a first symbol type and second character of a second symbol type;
    program instructions to receive a rule set for modifying the first metadata;
    responsive to determining that at least one rule of the rule set corresponds to the first metadata, program instructions to encrypt the first metadata based on the at least one rule of the rule set to create a second metadata, wherein the encryption is restricted to converting the first character to a third character of the first symbol type and converting the second character to a fourth character of the second symbol type; and
    storing, by one or more processors, the second metadata in the image file.

12. The computer program product of claim 11, wherein the second metadata is stored in the first metadata field.

13. The computer program product of claim 11, wherein the second metadata is stored to a blank data field of the plurality of data fields, and further comprising:
    program instructions to modify the first metadata in the first metadata field.

14. The computer program product of claim 11, wherein the second metadata is stored as a binary block, and wherein the block is appended to the image file.

15. The computer program product of claim 11, wherein the stored image file comprises at least one of (i) an encrypted first metadata field, (ii) a modified second metadata field, and (iii) an encrypted third metadata field.

16. A computer system, the computer system comprising:
    one or more computer hardware processors;
    one or more computer readable storage media;
    program instructions stored on the computer readable storage media for execution by at least one of the one or more computer hardware processors, the program instructions comprising:
    program instructions to receive an image file, wherein the image file comprises digital image data and a plurality of data fields, wherein a first data field of the plurality of data fields comprises a first metadata, wherein the first metadata is an ordered string of characters including a first character of a first symbol type and second character of a second symbol type;

program instructions to receive a rule set for modifying the first metadata;

responsive to determining that at least one rule of the rule set corresponds to the first metadata, program instructions to encrypt the first metadata based on the at least one rule of the rule set to create a second metadata, wherein the encryption is restricted to converting the first character to a third character of the first symbol type and converting the second character to a fourth character of the second symbol type; and storing, by one or more processors, the second metadata in the image file.

17. The computer system of claim 16, wherein the second metadata is stored in the first metadata field.

18. The computer system of claim 16, wherein the second metadata is stored to a blank data field of the plurality of data fields, and further comprising:

program instructions to modify the first metadata in the first metadata field.

19. The computer system of claim 16, wherein the second metadata is stored as a binary block, and wherein the block is appended to the image file.

20. The computer system of claim 16, wherein the stored image file comprises at least one of (i) an encrypted first metadata field, (ii) a modified second metadata field, and (iii) an encrypted third metadata field.

* * * * *